Figure 2:
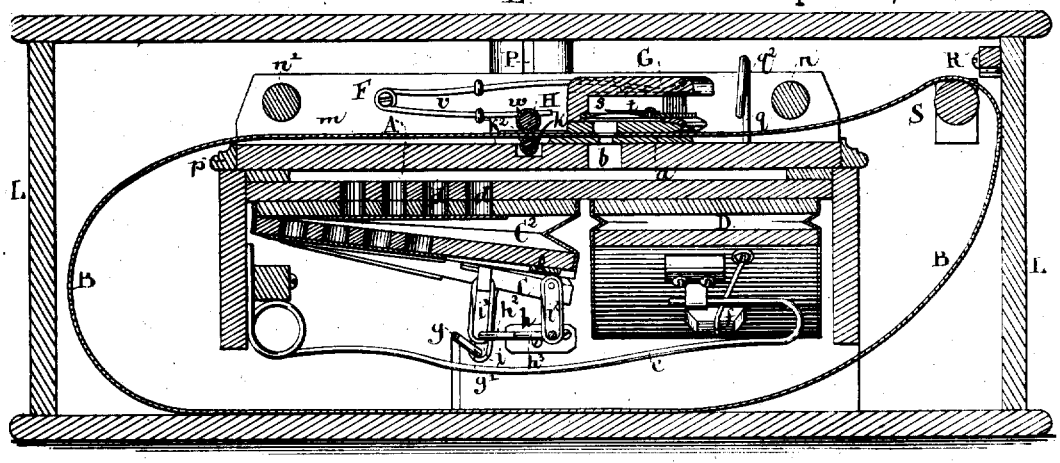

M. J. MATTHEWS, dec'd, 2 Sheets—Sheet 1

Assignor of two-thirds to J. MORGAN and J. NICHOL, (J. MATTHEWS, executrix, and J. MORGAN executor, of M. J. MATTHEWS.)

MECHANICAL MUSICAL INSTRUMENT.

No. 9,876. Reissued Sept. 13, 1881.

Witnesses:-

Louis M. Whitehead

Fred'k Haynes

Inventor:-

Milton J. Matthews

By his Attorneys

Brown & Brown

M. J. MATTHEWS, dec'd, 2 Sheets—Sheet 2.

Assignor of two-thirds to J. MORGAN and J. NICHOL, (J. MATTHEWS, executrix, and J. MORGAN, executor, of M. J. MATTHEWS.)

MECHANICAL MUSICAL INSTRUMENT.

No. 9,876. Reissued Sept. 13, 1881.

Witnesses:—

Louis M. Hohlhead

Fred Haynes

Inventor:—

M. J. Matthews, by his Attorneys,

Brown & Brown

UNITED STATES PATENT OFFICE.

MASON J. MATTHEWS, OF NEW YORK, ASSIGNOR OF TWO-THIRDS TO JAMES MORGAN, OF BROOKLYN, AND JOHN NICHOL, OF NEW YORK, N. Y., (JANE MATTHEWS, OF NEW YORK, EXECUTRIX, AND JAMES MORGAN, OF BROOKLYN, N. Y., EXECUTOR, OF MASON J. MATTHEWS, DECEASED.)

MECHANICAL MUSICAL INSTRUMENT.

SPECIFICATION forming part of Reissued Letters Patent No. 9,876, dated September 13, 1881.

Original No. 211,635, dated January 28, 1879. Application for reissue filed August 5, 1880.

*To all whom it may concern:*

Be it known that I, MASON J. MATTHEWS, formerly of Boston, in the county of Suffolk and State of Massachusetts, and later of the city and county of New York, in the State of New York, have invented certain new and useful Improvements in Mechanical Musical Instruments, of which the following is a specification.

The invention relates to that class of mechanical musical instruments in which a music sheet or band provided with perforations to represent the various notes of a tune is used as a valve or means to control the operation of the reeds; and one object of it is to provide means whereby a greater volume of tone can be produced in instruments of small size than has heretofore been possible.

The invention consists in the combination, in a mechanical musical instrument, of sound-producing devices, a music-sheet for controlling their operation, a top board, a rest for the music-sheet elevated above the said top board, and feed-rollers for imparting motion to the music-sheet, the lower of which is fitted into a recess in the top board, so as to obviate it from projecting above the rest, and lifting the music-sheet therefrom without entailing unnecessary elevation of the rest above the top board to effect this relation between it and the lower feed-roller.

It also consists in the combination, in a mechanical musical instrument, of sound-producing devices, a music-sheet for controlling their operation, a top board, and a rest for the music-sheet, made of a separate and flat piece of wood, attached directly to the top board, leaving no space or chamber between its upper surface and said top board, but provided with apertures for the passage of air through it, whereby the elevation of the rest above the top board is provided for in a simple manner.

It also consists in the combination, in a mechanical musical instrument, of a removable reed-chest, means for operating the reeds, and a music-sheet for controlling the operation of the reeds traveling below the reed-chest.

It also consists in the combination, in a mechanical musical instrument, of a music-sheet for controlling the operation of sound-producing devices, a reed-chest containing ducts for air to effect the operation of the sound-producing devices, and a spring or springs for impelling said reed-chest down on the music-sheet, whereby leakage between the air-ducts and music-sheet is obviated.

It also consists in the combination, in a mechanical musical instrument, of a top frame capable of being moved away from the top board of the instrument and a removable reed-chest connected thereto when in use.

It also consists in the combination, in a mechanical musical instrument, of sound-producing devices, a music-sheet for controlling their operation, a top frame capable of being moved away from the top board of the instrument, and an adjustable presser for holding the music-sheet in place, and preferably a spring or springs for impelling the presser downward.

It also consists in a mechanical musical instrument having a rocker-shaft provided at each end with a hook or hook-hasp, and at or near the middle of its length with an operating lever or handle, all formed in a single piece of wire, whereby the top frame may be conveniently fastened.

It also consists in the combination, in a mechanical musical instrument, of a driving-shaft arranged above the top board, sound-producing devices, bellows for operating the sound-producing devices, arranged below the top board, and a pitman-rod connected to said shaft and serving to operate the bellows, but having no connection with or support from other parts of the instrument.

It also consists in the combination, in a mechanical musical instrument, of sound-producing devices, bellows for operating the same, a music-sheet for controlling their operation, a feed-roller, preferably cranked, for imparting motion to the music-sheet, and pitman-rods connected to said feed-roller and extending close to the sides of the instrument, but having no connection with or support from the case of the instrument, and serving to operate said bellows.

It also consists in the combination, in a mechanical musical instrument, of sound-producing devices, bellows for operating the same, a music-sheet for controlling their operation, and a feed-roller for imparting motion to the music-sheet, a crank carried by said feed-roller, a pitman-rod for operating said bellows, slotted to form jaws, and means whereby said jaws are caused to gripe said crank and have a firm connection therewith.

It also consists in the combination, in a mechanical musical instrument, of sound-producing devices, two bellows for operating the same, a music-sheet for controlling their operation, a feed-roller for imparting motion to the music-sheet, shaft provided with reversely-set cranks connected to the bellows for operating them alternately, and also provided with a crank at the end, and a pitman-rod connecting the feed-roller and the last-said crank, so as to transmit motion from one to the other.

It also consists in the combination, with a wind-chest provided upon its upper side with a series of wind-passages, a feed-roll having its bearings upon the upper side thereof, suitable wind-moving bellows placed beneath said wind-chest, and an endless band of paper provided with a series of perforations to represent the various notes of a tune, and adapted to rest upon the upper side of said wind-chest and to pass around said wind-chest and the wind-moving bellows, of a detachable frame having mounted thereon a secondary feed-roll, and a reed-chamber provided with a series of wind-passages and reeds, and adapted to be pressed upon the perforated paper directly around the wind-passages in the wind-chest when the said frame is secured in position on the wind-chest.

It also consists in the combination, with a portable mechanical musical instrument that is mechanically and musically complete in and of itself, of an inclosing-casing, within which the instrument may be entirely hid from view, except the operating-crank, and from which it may be readily and easily removed when it is desired to change the tune, said casing being designed to hide the operating parts of the instrument, and rendering it more ornamental, as it may be ornamented in a great variety of ways, according to the taste of the builder.

Figure 1:
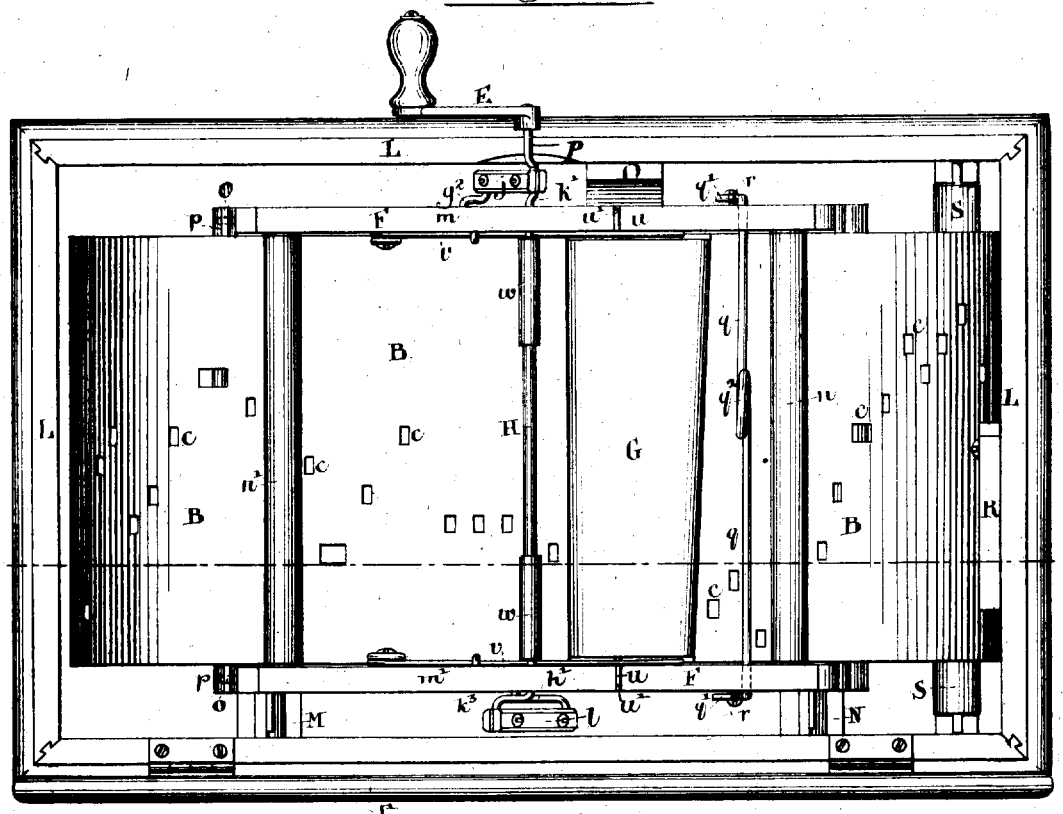
Figure 4:
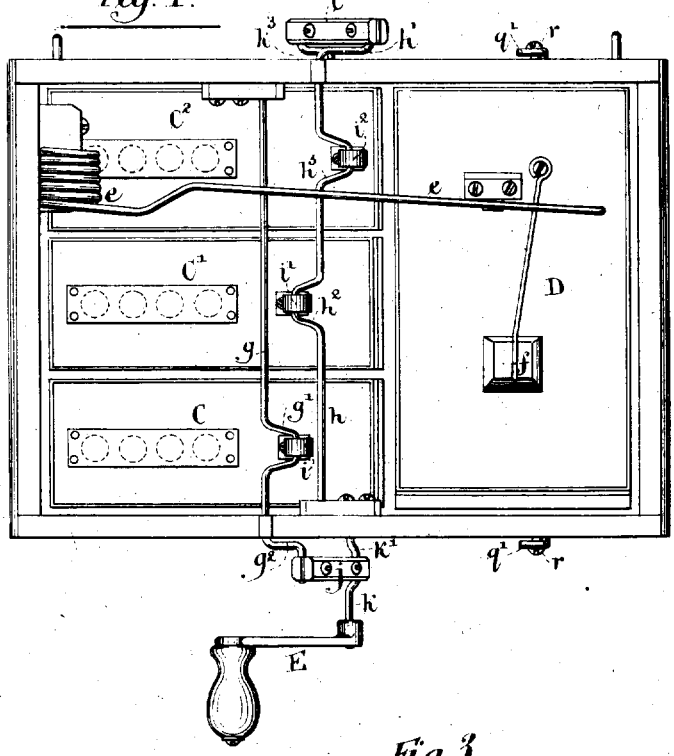
Figure 3:
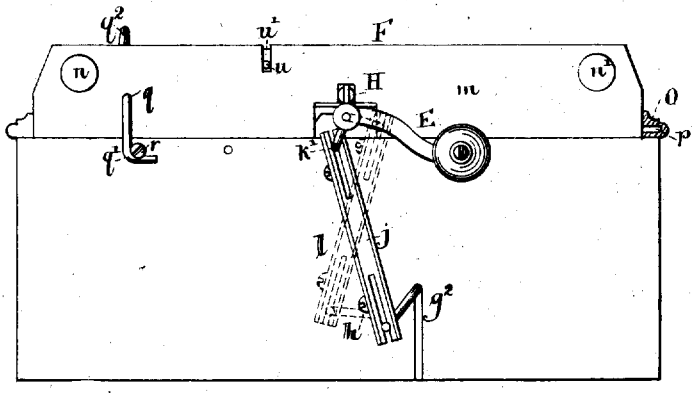
Figure 5:
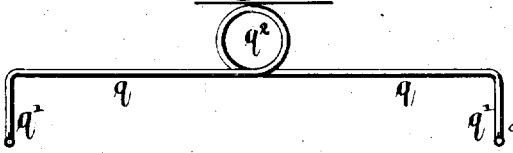

In the accompanying drawings, Figure 1 is a plan of an instrument embodying the invention, with the lid of the outer casing turned up edgewise. Fig. 2 is a vertical longitudinal section of the same on line *x x* on Fig. 1. Fig. 3 is a side elevation of the instrument removed from the outer casing. Fig. 4 is an inverted plan, with the outer casing removed; and Fig. 5 is a side elevation of the double fastening-hasp.

A is the wind-chest, provided upon its upper side with the raised platform-like surface or rest *a*, through which is cut a series of wind passages or apertures, *b*, and upon which the music-sheet or band of paper B rests, the suction of the bellows C, C′, and C² causing said sheet or endless band of paper B to hug closely to said platform-surface and prevent all passage of air to the bellows, except through the perforations *c* in the paper and the wind passages or apertures *b*. The rest *a* is shown as made of a separate and flat piece of wood attached directly to the top board of the instrument, leaving no space between its upper surface and the said top board.

C, C′, and C² are three suction-bellows, arranged side by side immediately beneath the wind-chest A, and each communicating therewith through the passages *d*.

D is a reservoir, also arranged directly beneath the wind-chest A, communicating therewith by suitable passages, said reservoir being kept expanded by the tension of the spring *e*, all in a well-known manner. The reservoir D is also provided with a valve, *f*, having an inwardly-projecting stem, which, in case the reservoir should collaspe too far, will strike the upper board of the reservoir and cause said valve to open and admit sufficient air to the interior of the reservoir or vacuum-chamber and prevent it from becoming permanently collapsed.

The three bellows C, C′, and C² are moved alternately or in succession, one after another, in the following manner: Two rocker-shafts, *g* and *h*, extend across the instrument from front to rear some distance below the bellows, and each have bearings in the frame or case of the instrument, as shown in Fig. 4. The rocker-shaft *g* has formed in it the crank *g′*, to which is coupled one end of a connecting-rod, *i*, the other end of which is hinged or otherwise connected to the under side of the bellows C; and the front end of said rocker-shaft has formed thereon the crank $g^2$, connected by the pitman or connecting rod or link *j* to the crank *k′*, formed in the shaft of the driving-shaft or feed-roller *k*, mounted in suitable bearings in the upper side of the wind-chest A, and provided at its extreme front end with the operating-crank E, as shown. The shaft-roller *k* has a portion of its length covered with a rubber tube or tubes, $k^2$, and has formed upon its rear end the crank $k^3$, from which the pitman or connecting rod or link *l* (shown in full in Figs. 1 and 4 and in dotted lines in Fig. 3) leads to and is coupled to the crank *h′*, formed on the rear end of the rocker-shaft *h*, all so arranged that a revolution of the driving shaft or roller *k* will cause an oscillating or rocking motion to be imparted to the shafts *g* and *h* in an obvious manner. The shaft *h* also has formed therein two cranks, $h^2$ and $h^3$, projecting from opposite sides of said shaft, or reversely set, as shown in Fig. 4. The pitman-rods *j* and *l* have a perfectly free movement, they having no connection with any part of the instrument other than the shafts which they connect; and the ends of said rods are slotted to form jaws, which, by screws or other devices, may be caused to tightly gripe the cranks upon the shafts $g$ $h$ $k$ and have a firm connection therewith. The crank $h^2$ is coupled to one end of the link $i'$, the other end of which is hinged or otherwise connected to the under side of the bellows C'. The crank $h^3$ is in like manner connected by means of the link $i^2$ to the bellows $C^2$.

F is a detachable top frame, made up of the side rails, $m$ $m'$, and the two tie-rods $n$ and $n'$, and secured in position upon the upper side of the wind-chest by means of the pins $o$ $o$, set in one end of the side rails, $m$ and $m'$, and adapted to engage with sockets formed in the molding $p$ for the purpose, and the rocker-shaft $q$, provided at each end with a hook or hasp, $q'$, each adapted to engage with a pin, $r$, set in the side of the frame of the instrument, as shown in Fig. 3, said rocker-shaft $q$, the two hook-fasteners, $q'$, and a lever, $q^2$, for operating the fasteners, being made from a single piece of wire, as shown in Fig. 5. The rails $m$ $m'$ form guides for the music-sheet.

G is a board or chest, having formed therein a series of chambers, $s$, in each of which is set a sound-producing device consisting of a metallic reed, $t$, in any well-known manner. These reeds are arranged in what may be termed a "compromise scale," consisting of fourteen reeds arranged at musical intervals apart, as follows: between the lowest-pitch reed, or first reed and second reed, a whole tone; between the second and third reeds, a whole tone; between the third and fourth reeds, a half-tone; between the fourth and fifth reeds, a whole tone; between the fifth and sixth reeds, a whole tone; between the sixth and seventh reeds, a half-tone; between the seventh and eighth reeds, a half-tone; between the eighth and ninth reeds, a half-tone; between the ninth and tenth reeds, a whole tone; between the tenth and eleventh reeds, a whole tone; between the eleventh and twelfth reeds, a half-tone; between the twelfth and thirteenth reeds, a whole tone; and between the thirteenth and fourteenth reeds, a whole tone. In this way, with but few reeds, provision is afforded for playing tunes of great compass and for producing a very compact instrument. The reed board or chest G is provided at each end with a trunnion-pin, $u$, which rests in a slot, $u'$, formed in the upper edge of each of the rails $m$ and $m'$ of the frame F, the spring $v$ resting upon said trunnion-pin $u$, and by its tension pressing the reed-chest G hard upon the music-sheet B, as shown. The reed-chest may be removed at pleasure by lifting it against the action of the spring, so as to remove the trunnion-pins $u$ from the slots $u'$. It is obvious that the reed-chest thus made forms an adjustable and removable presser arranged over the rest for holding the music-sheet to its rest. The reed-chest may also be removed or adjusted with the top frame, F.

H is a second feed-roll, having its bearings in the side rails, $m$ $m'$, of the frame F, in a position to engage with the driving shaft or roller $k$ when the frame F is placed in position, and be rotated by frictional contact therewith, and thus feed the music-sheet or endless band of paper B along, drawing it between the reed-chest and the upper surface of the platform or rest $a$, and bringing the different perforations formed therein successively into position to permit the passage of wind through the sound-producing devices or reeds to the bellows, and thus cause the various notes to be sounded. The roll H has a portion of its length covered with rubber tubes $w$ $w$, as shown in Fig. 1. It is adjustable relatively to the lower feed-roller or driving-shaft and impelled toward it, so as to tightly gripe the music-sheet, by the spring or springs $v$.

The music-sheet B is preferably used in the form of an endless band, which passes around under the bellows, as shown in Fig. 2; but a sheet or strip of paper not connected together at its ends to form an endless band may be used, if desired.

The instrument, constructed as heretofore described, is complete in and of itself so far as the mechanical operation of the instrument is concerned or the musical notes produced thereby, and it is proposed to manufacture a cheap instrument substantially as herein described; but in order to meet the requirements of those who wish for something more ornamental, and are willing to pay a higher price, there may be provided an ornamental inclosing-case, L, provided with a hinged lid, L', and suitable chocks, M, N, and O, to hold the instrument in a fixed position in said casing, the front of said casing being also provided with a slot, P, to receive the driving-shaft $k$, all so arranged that when the instrument is placed in position in the casing the crank E is outside of said casing, and the instrument may be operated therein, and need never be removed from said casing except for repairs or when it may be desired to change the tune, when it may be readily lifted from the casing without removing screws or other fastenings.

R is a prop for holding up the lid L', and S is a roll over which the band of paper is carried when the tune is a long one, in order to take up some of the slack.

There are here shown but three wind-moving bellows; but it is obvious that, if desired, a fourth bellows may be added and operated from the rocker-shaft $g$ by forming in said rocker-shaft another crank, projecting therefrom upon the side opposite to the crank $g'$, so that the shaft $g$ shall operate two bellows precisely in the same manner that the shaft $h$ operates the two bellows C' and $C^2$, the cranks $k'$ and $k^3$ on the driving-shaft $k$ being placed at the proper angle to each other to open and close said bellows in succession, or so that no two of said bellows shall be fully closed or open at the same time.

The removable frame is not claimed, broadly, in this application, as substantially the same device is shown and described in other Letters Patent; but

What is claimed as the invention, and desired to be secured by Letters Patent, is—

1. In a mechanical musical instrument, the combination of sound-producing devices, a music-sheet for controlling their operation, a top board, a rest for the music-sheet elevated above said top board, and feed-rollers for imparting motion to the music-sheet, the lower of which is fitted into a recess in the top board so as to obviate its projecting above the rest without entailing unnecessary elevation of the rest above the top board to effect this relation between it and the lower feed-roller, substantially as specified.

2 In a mechanical musical instrument, the combination of sound-producing devices, a music-sheet for controlling their operation, a top board, and a rest for the music-sheet made of a separate and flat piece of wood attached directly to the top board, leaving no space or chamber between its upper surface and the top board, but provided with apertures for the passage of air through it, substantially as specified.

3. In a mechanical musical instrument, the combination of a removable reed-chest, means for operating the reeds, and a music-sheet for controlling the operation of the reeds traveling below the reed-chest, substantially as specified.

4. In a mechanical musical instrument, the combination of a music-sheet for controlling the operation of sound-producing devices, a reed-chest containing ducts for air to effect the operation of the sound-producing devices, and a spring or springs for impelling the said reed-chest down on the music-sheet, substantially as specified.

5. In a mechanical musical instrument, the combination of a top frame capable of being moved away from the top board of the instrument, and a removable reed-chest connected thereto when in use, substantially as specified.

6. In a mechanical musical instrument, the combination of sound-producing devices, a music-sheet for controlling their operation, a top frame capable of being moved away from the top board of the instrument, and an adjustable presser for holding the music-sheet in place, substantially as specified.

7. In a mechanical musical instrument, the combination of sound-producing devices, a music-sheet for controlling their operation, a top frame capable of being moved away from the top board of the instrument, an adjustable presser for holding the music-sheet, and a spring or springs for impelling the presser downward, substantially as specified.

8. In a mechanical musical instrument, the rocker-shaft $q$, provided at each end with a hook-hasp, $q'$, and at or near the middle of its length with the operating lever or handle $q^2$, all formed from a single piece of wire, substantially as specified.

9. In a mechanical musical instrument, the combination of a driving-shaft arranged above the top board, sound-producing devices, bellows for operating said sound-producing devices, arranged below the top board, and a pitman-rod connected to said shaft and serving to operate the bellows, but having no connection with or support from other parts of the instrument, substantially as specified.

10. In a mechanical musical instrument, the combination of sound-producing devices, bellows for operating the same, a music-sheet for controlling their operation, a feed-roller for imparting motion to said music-sheet, and pitman-rods connected to said feed-roller and extending close to the sides of the case of the instrument, but having no connection with or support from said case, and serving to operate said bellows, substantially as specified.

11. In a mechanical musical instrument, the combination of sound-producing devices, bellows for operating the same, a music-sheet controlling their operation, a feed-roller for imparting motion to the music-sheet, a crank carried by said feed-roller, a pitman-rod for operating said bellows, slotted to form jaws, and means whereby said jaws are caused to gripe said crank and have a firm connection therewith, substantially as specified.

12. In a mechanical musical instrument, the combination of sound-producing devices, two bellows for operating the same, a music-sheet for controlling their operation, a feed-roller for imparting motion to the music-sheet, a shaft provided with reversely-set cranks connected to the bellows for operating them alternately, and also provided with a crank at one end, and a pitman-rod connecting the feed-roller and the last said crank, so as to transmit motion from one to the other, substantially as specified.

13. The combination of three or more wind-moving bellows arranged side by side, two rocker-shafts, $g$ and $h$, each provided with two or more cranks, as set forth, two connecting-rods, $j$ $l$, driving-shaft $k$, provided with cranks E, $k'$, and $k^3$, and a connecting rod or link connecting the bottom board of each of said bellows with one of the cranks of said rocker-shafts, all arranged and adapted to operate substantially as and for the purpose specified.

14. In combination with a wind-chest provided upon its upper side with a series of wind-passages communicating therewith, a driving-shaft or feed-roll mounted upon the upper side of said wind-chest, suitable wind-moving bellows placed beneath said wind-chest, and an endless band of perforated paper passing around said wind-chest and wind-moving bellows, as set forth, the detachable frame F, the secondary feed-roll H, having its bearings on said frame, the reed-board G, provided with trunnion-pins $u$ $u$, fitted to and resting in the slots $u'$ in the side rails of the frame F, and the springs $v$ $v$, all arranged and adapted to operate substantially as and for the purposes described.

15. In combination with a portable mechanical musical instrument that is mechanically and musically complete in and of itself, an independent inclosing-casing provided with a hinged lid, a slot for the passage of the crank-shaft, and suitable chocks secured therein to hold the instrument in position, all arranged and adapted to operate as herein set forth, so that the instrument may be readily lifted from said casing without removing fastenings of any kind

MASON J. MATTHEWS.

Witnesses:
CHARLES H. HOLDEN,
M. A. MADDEN.